Figures 1, 2, 3:
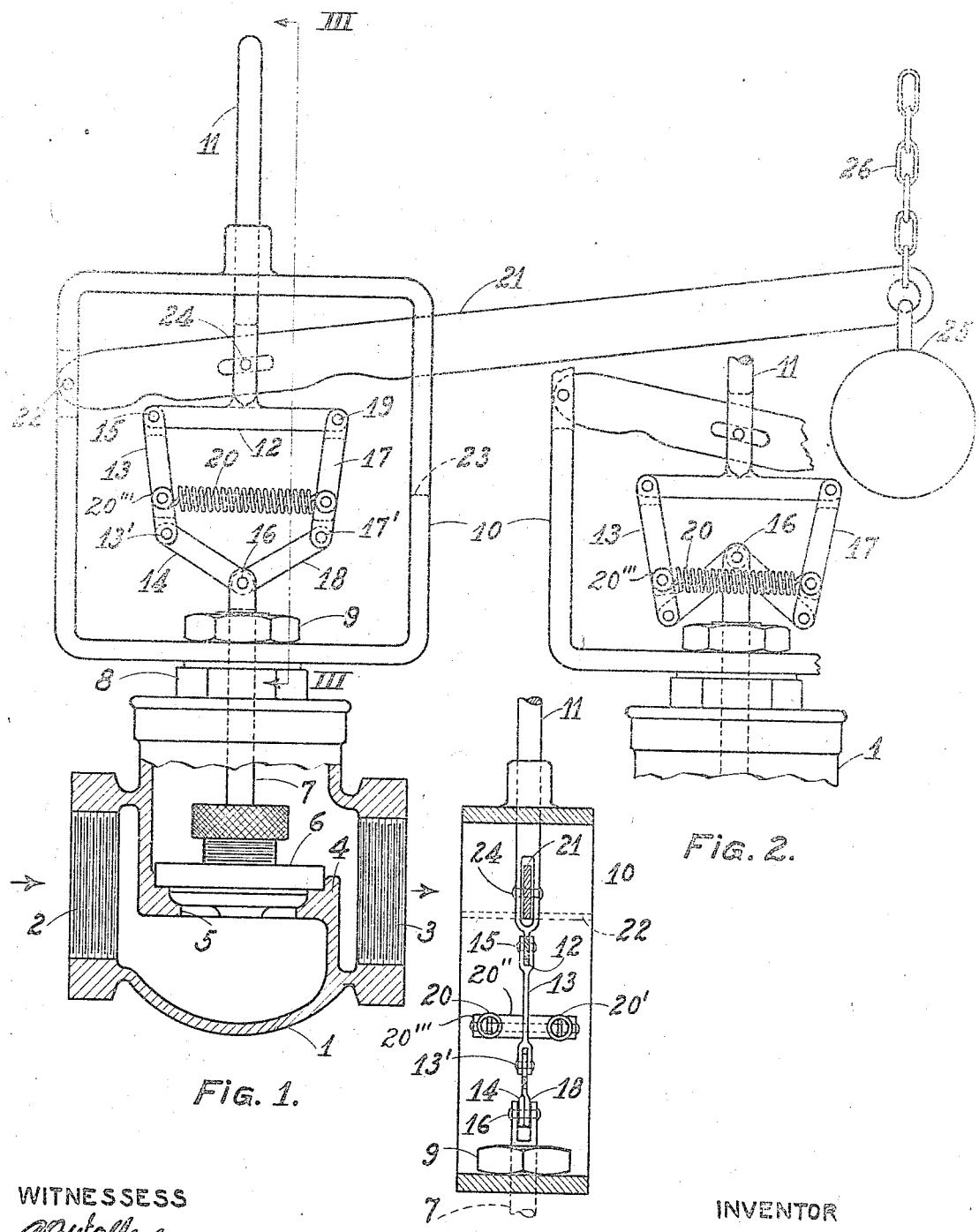

Dec. 18, 1923.

A. W. FRANCIS 1,477,641

SNAP ACTING GAS CONTROL VALVE

Filed Dec. 5, 1921

WITNESSES

INVENTOR
Albert W. Francis
By Winter & Brown
ATTORNEYS

Patented Dec. 18, 1923.

1,477,641

UNITED STATES PATENT OFFICE

ALBERT W. FRANCIS, OF LATROBE, PENNSYLVANIA, ASSIGNOR TO CHARLES HOWARD HOOK, OF PITTSBURGH, PENNSYLVANIA.

SNAP-ACTING GAS-CONTROL VALVE.

Application filed December 5, 1921. Serial No. 519,915.

*To all whom it may concern:*

Be it known that I, ALBERT W. FRANCIS, a citizen of the United States, and a resident of Latrobé, in the county of Westmoreland and State of Pennsylvania, have invented a new and useful Improvement in Snap-Acting Gas-Control Valves, of which the following is a specification.

This invention relates to valves and particularly to valves adapted to be used as control valves for controlling the flow of gas to the burners of a boiler or for other similar purposes.

It is an object of the invention to provide such a valve having a snap action, that is, one in which the valve head will be quickly and positively moved to full open position or to its completely closed position as occasion may demand. It is a special object to provide a valve having a snap action in both opening and closing which is simple, compact, cheap to manufacture, easy to repair and efficient in operation. It is a further object to provide such a device which is not influenced by small variations in the position of the element controlling the valve caused by vibrations which usually occur during the normal operation of many controlling elements such as pressure diaphragms but which is responsive to immediately open or close the valve the moment the controlling element is displaced a predetermined extent; and it is still a further object to provide a device in which a yielding connection is provided between the controlling element and the valve stem whereby a damping or steadying effect will be exerted upon the controlling element due to its connection with the valve.

In the accompanying drawings Fig. 1 is an elevational view partly in section of the preferred embodiment of the invention showing the several parts in position to close the valve. Fig. 2 is a fragmentary elevation showing the position which the parts assume when the valve is open, and Fig. 3 is a section taken on the line III—III of Fig. 1.

The valve comprises a casing 1 provided with a passage extending therethrough from the inlet 2 to the outlet 3, and with the usual diaphragm 4 the port 5 of which is adapted to be closed by the valve head 6 attached to the stem 7 projecting through a suitable gland 8 to the exterior of the casing.

Fixed to the casing in any suitable manner, as by the nut 9, is a rectangular frame 10. Slidably mounted in the frame, and capable of longitudinal movement in the direction of the axis of stem 7 is a rod 11 having a cross head 12 formed at its lower portion. A toggle formed of links 13, 14 pivotally connected at 13' is pivoted at its opposite ends to one extremity of the cross head 12 and valve stem 7 respectively, as indicated at 15 and 16, and a similar toggle formed of links 17, 18 pivotally connected at 17' is likewise pivoted to the opposite extremity of the cross head, as indicated at 19, and to the valve stem at 16. Retractile springs 20 and 20' have their opposite ends fixed to links 13 and 17 at corresponding points thereon for constantly urging the arms of the toggles inwardly towards each other. Said springs are arranged symmetrically with respect to the axis of the stem 7 and are spaced by means of spacing sleeves 20", being attached by nuts 20''' abutting thereagainst.

A lever 21 pivoted at 22 at one end and extending through a slot 23 in the frame 10 has a pin and slot connection with the rod 11, as shown at 24, and is provided at its opposite end with a counter weight 25 and a chain connection 26 leading to the movable controlling element for the valve, such as a pressure diaphragm or other well known similar controlling device in response to whose movements the valve is to be opened or closed.

In the operation of the device as illustrated, whenever the position of the controlling element to which the chain 26 is attached permits the weight 25 to move the lever 21 downwardly from the position shown in Fig. 1 a sufficient distance to cause the pivotal points 13', 17' to pass below the pivotal connection 16, the springs 20 and 20' will draw the arms 13, 17 inwardly and force the arms 14, 18 to lift the valve stem 7 to the position shown in Fig. 2, opening the valve to its full extent. Whenever the controlling element lifts the lever 21 from the position shown in Fig. 2 sufficiently to raise the pivotal connections 13', 17' above the pivotal connection 16, the parts will be caused to again assume the position shown in Fig. 1, causing the valve to close its full extent.

It is to be noted that the movement of the rod 11 is limited in both directions by reason of the fact that lever 21 contacts the ends of the slot 23 in frame 10, the length of the slot being slightly greater than is necessary to move the pivotal connections 13', 17' to the extent above noted. It is therefore seen that in order to open the valve it is necessary to move the lever 21 from its position shown in Fig. 1 nearly to that shown in Fig. 2, and similarly, in order to close the valve, the said lever must be moved from its position in Fig. 2 nearly to that of Fig. 1, in other words, in order to actuate the valve the lever must be moved throughout nearly its whole range of movement. Any intermediate position of the lever between those in which the pivotal connections 13', 16 and 17' are aligned will merely put the springs under more or less tension. It is therefore clear that any slight movements or vibrations of the controlling element attached to chain 26 will not affect the position of the valve which is unresponsive until the lever 21 has reached its critical limits above described; but as soon as these limits have been exceeded the valve immediately responds to any additional movement and is moved to either its full open or full closed position with a snap action under the tension of springs. It is also clear that the gradual increase in the tension of the springs between these limits, regardless of the direction of movement of lever 21, acts as a damping or steadying mechanism preventing hunting of the controlling element.

The rod 11 is positioned and guided so as to be in alignment with the stem 7 and the cross head 12, springs 20 and 20' and the several toggles are all arranged symmetrically with respect to the axis of the valve stem and rod 11 so as to eliminate lateral stresses, thus providing a very smooth working and sensitive construction for the purpose intended.

In the embodiment illustrated the controlling element is attached to the chain 26 and actuates the rod 11 through the lever 21. The controlling element, however, may be connected directly to the rod 11 and any suitable means for limiting the movement of the rod in either direction may be employed.

Although I have described the construction and mode of operation of the preferred embodiment of the invention, as required by the patent statutes, it is not intended to limit the invention beyond that specifically defined in the appended claims.

I claim:

1. A valve comprising a casing provided with a passage therethrough, a valve head adapted to close said passage, a stem attached to the head and projecting through the casing, a cross head held against lateral movement and guided for travel in the direction of the axis of said stem, a pair of toggles each of which has one end pivoted to the cross head and its opposite end pivoted to the valve stem, means for urging the corresponding arms of the toggles towards each other, and means for moving the said cross head.

2. A valve comprising a casing provided with a passage therethrough, a valve head adapted to close said passage, a stem attached to the head and projecting through the casing, a frame fixed to the casing, a rod mounted in the frame in alignment with the said stem, a pair of toggles each having one end pivoted to the valve stem, and its opposite end pivoted to the said rod, means for urging the arms of the toggles toward each other and means for moving the rod.

3. A valve comprising a casing provided with a passage therethrough, a valve head adapted to close said passage, a stem attached to the head and projecting through the casing, a frame fixed to the casing, a rod mounted in the frame in alignment with the said stem, a cross head on the rod, a pair of toggles having one end pivoted to the stem and their opposite ends pivoted to the cross head, a spiral spring urging corresponding arms of the toggles toward each other and means for reciprocating the rod.

4. A valve comprising a casing provided with a passage therethrough, a valve adapted to close said passage, a stem attached to the head and projecting through the casing, a frame fixed to the casing, a rod mounted in the frame in alignment with the said stem, a cross head on the rod, a pair of toggles having one end pivoted to the stem and their opposite ends pivoted to the cross head, a spiral spring urging corresponding arms of the toggles toward each other, means for actuating the rod and means for limiting its movement in either direction.

5. A valve comprising a casing provided with a passage therethrough, a valve head adapted to close said passage, a stem attached to the head and projecting through the casing, a frame fixed to the casing, a rod mounted in the frame in alignment with the said stem and actuated for longitudinal movement in a direction corresponding to the axis thereof, a cross head on the rod, a pair of similar toggles having one end pivoted to the extremity of the cross head and their opposite ends pivoted to the said stem, a retractile spring connected to corresponding points of corresponding arms of said toggles for urging the same toward each other, and means for actuating the rod so as to move the pivotal connections between the arms of the toggles across the plane of the pivotal connections with the said stem.

6. A valve comprising a casing provided with a passage therethrough, a valve head adapted to close said passage, a stem attached to the valve head and projecting from the casing, a frame fixed to the casing, a rod mounted in the frame and guided for longitudinal movement in the direction of the axis of said stem, a cross head on the inner end of the rod, a pair of links pivoted to the opposite ends of the cross head, a second pair of links pivoted to the extremity of the valve stem, said pairs of links being pivoted to each other to form toggles, a spring connected at its opposite ends to one pair of links to urge the same toward each other, a lever pivoted in the frame and having an operative connection with the said rod, means for limiting the movement of the rod in either direction, said lever being adapted to move the pivotal connections between said links across the plane of the pivotal connection with the valve stem whereby the valve is opened and closed with a snap action.

7. A valve comprising a casing provided with a passage therethrough, a valve head adapted to close said passage, a stem attached to the valve head and projecting from the casing, a frame fixed to the casing, a rod mounted in the frame and guided for longitudinal movement in the direction of the axis of said stem, a cross head on the inner end of the rod, a pair of links pivoted to the opposite ends of the cross head, a second pair of links pivoted to the extremity of the valve stem, said pairs of links being pivoted to each other to form toggles, springs connected at their oppostie ends to one pair of links to urge the same toward each other, a lever pivoted in the frame and having operative connection with the said rod, means for limiting the movement of the lever in both directions, said lever being adapted to move the pivotal connections between said pairs of links across the plane of the pivotal connections with the valve stem whereby the valve is opened and closed with a snap action, the cross head, links and springs being symmetrically arranged with respect to the said axis.

In testimony whereof, I sign my name.

ALBERT W. FRANCIS.